PATTERN COMPONENT EMITTER

Filed April 27, 1948 3 Sheets-Sheet 1

INVENTORS
James W. Bryce
Robert T. Blakely
BY Robert S. Dunham
ATTORNEY

INVENTORS
James W. Bryce
Robert T. Blakely
BY Robert S. Dunham
ATTORNEY

PATTERN COMPONENT EMITTER

Filed April 27, 1948 3 Sheets-Sheet 3

INVENTORS
James W. Bryce
Robert T. Blakely
BY Robert S. Dunham
ATTORNEY

Patented May 15, 1951 2,553,170

UNITED STATES PATENT OFFICE 2,553,170

PATTERN COMPONENT EMITTER

James W. Bryce, Glen Ridge, N. J., and Robert T. Blakely, Amityville, N. Y., assignors to International Business Machines Corporation, New York, N. Y., a corporation of New York Application April 27, 1948, Serial No. 23,564

7 Claims. (Cl. 177—337)

This invention relates to improved control apparatus for controlling character display by cathode ray tubes.

In United States Patents Nos. 2,264,623, 2,267,812 and 2,264,587 such control means was provided by a pattern component emitter which included rotatable discs having light tracks thereon which were scanned by photo-cells. The light tracks were coordinated with components of character outlines. The photo-cell means controlled amplifying means which in turn applied controlling potential to the cathode ray character displaying tubes.

According to the present invention the use of light tracks and scanning photo-cells is dispensed with and in lieu thereof the rotatable pattern component emitter comprises a capacity changing device which during rotation provides changes in capacity which are related to the two components of character outlines. The changes in capacity control the frequency of oscillators. These oscillators in turn control the voltage output of frequency discriminators. The frequency discriminators apply their output voltage changes to the deflection plates of cathode ray tubes through amplifiers.

The present invention has for its general object the improvement of the pattern component emitter as described in the foregoing patents.

A further object of the present invention resides in the provision of an improved pattern component emitter wherein capacity change effects are utilized for controlling character outlines.

A further object of the present invention resides in the provision of means for controlling character slant.

A further object resides in the provision of a pattern component generator of electronic character adapted to utilize capacity change effects and to convert capacity variation into voltage variation through oscillator and frequency discriminator means.

The pattern component emitter which forms the subject-matter of the present invention is intended for use in systems of the type shown in Bryce Patent No. 2,267,812, Dickinson Patent No. 2,264,623, and Roth Patent No. 2,264,587. In all of these previous systems cathode ray number displaying tubes were provided. These were supplied with controlling potentials through photo-cell controlled amplifier units, one unit being for the Y component potentials and the other unit for the X component potentials. Character selecting means were also provided and commutator selecting devices, such as shown at 38 in Fig. 15A of the Bryce patent, were also provided. In the present application, the commutator devices are retained and the amplifier units are shown on the circuit diagram. For a description of other cooperating parts of the complete system, reference may be had to the abovementioned patents.

Figure 1:
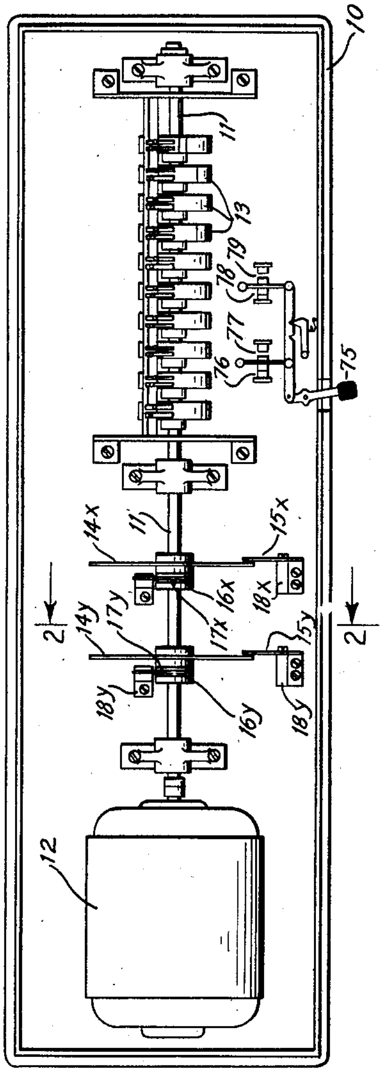
Fig. 1 is a top plan view of the pattern component emitter unit with the cover removed to show the parts beneath the cover.

Referring now to Fig. 1, the pattern component emitter unit is contained in a suitable box 10. Within the box is a suitably journaled shaft 11, adapted to be driven by a constantly running motor 12. Disposed on the shaft are a group of commutator selectors which are generally designated 13, such commutator selectors correspond to commutator selectors 38 shown in Fig. 15A of the Bryce patent. Also disposed on the shaft 11 and rotatable therewith, are a pair of rotatable metallic plates 14Y and 14X. Each plate has adjacent its periphery and spaced therefrom fixed metallic plates 15X and 15Y.

Figure 2:
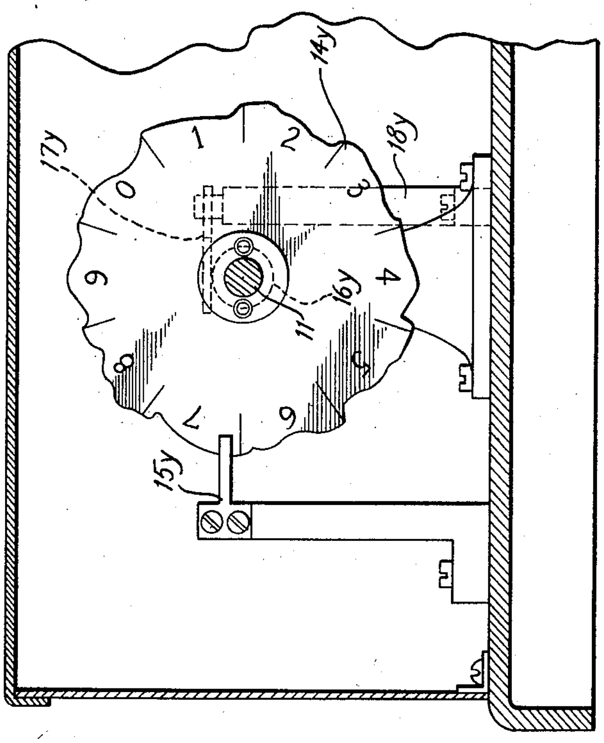
Fig. 2 is a sectional view of the pattern component emitter unit, the section being taken on line 2—2 of Fig. 1.

Referring now to Figure 2, it will be noted that the plate 14Y has a variably notched peripheral portion. It will be appreciated that with one of the plates rotating the variable notched peripheral portion will, in cooperation with the fixed plates, provide variable overlapping areas during rotation. This, in effect, provides a variable capacity depending upon the amount of overlapping area of the periphery of the rotatable plate with respect to the constant area of the fixed plate.

Plates 14X and 14Y are preferably insulated from the shaft 11 and each rotatable plate has adjacent thereto and rotatable therewith a commutator 16X or 16Y, made of conducting material which is electrically connected to the plate. Co-operating with the commutators 16X and 16Y are brushes 17X and 17Y.

Referring again to the fixed plates 15X and 15Y, these plates are preferably mounted on brackets such as 18X and 18Y, adjustably secured to the base plate of the emitter housing. The adjustment will permit adjusting the gap between each fixed plate and its rotatable plate.

Referring now to Figure 2, it will be noted that the disc 14Y is shown divided up into successive segments or segment portions. The segment portions of this disc have each been given a designating figure, such as 0, 1, 2, 3, 4, 5, 6, 7, 8 and 9. The segments of the related X disc would have like designating numbers. As briefly explained heretofore, the purpose of the varying contour of the periphery of the disc 14Y is to provide for proper variation of the condenser capacity. As explained heretofore, the above-mentioned capacity is connected in an oscillator circuit and, as is well known in such circuits, the resonant frequency $f$ is obtained from the equation:

$$f=\frac{1}{2\pi}\sqrt{LC} \qquad (1)$$

$f$=the frequency in cycles per second
L=the inductance in micro-microhenries
C=the capacity in micromicrofarads
$\pi=3.1416+$ with L the inductance maintained at a constant value then the frequency $f$ is inversely proportional to the square root of the capacity C.

The capacity C is obtained from the equation:

$$C=K\frac{0.2244A}{d} \qquad (2)$$

C=capacity in micromicrofarads
K=dielectric constant=1 for air
A=superimposed area of one plate with respect to the other in square inches
$d$=spacing of plates in inches (for example 0.020 inch)

In actual practice for this device two condensers are provided, one of which is fixed and retains the oscillator at a desired maximum frequency. The other is variable and comprises the overlap between, for example, the fixed plate 15$y$ and the rotating plate 14$y$ and varies the frequency below the desired maximum in a precise manner. Since the capacity variation is small it was found that having all the capacity in these plates necessitated extreme accuracy in shaping the plate 14$y$ since the percentage area variation was small. By using the fixed condenser in parallel with the variable vernier shaping of the disc was found to be easier.

From the foregoing it will be apparent that when a disc such as 14Y is rotated the capacity and accordingly the frequency of the oscillator output will be changed. As capacity increases the frequency will decrease. This decrease in turn will result in an increased voltage output which is fed through a customary amplifier to the Y plates of the cathode ray tubes. Similar controls are provided for the X plates of the cathode ray tubes. By changing the potential on both sets of plates of the cathode ray tubes, as fully described in the above-mentioned patents, any desired character may be traced on the cathode ray tube screen.

The manner of laying out the disc segments will now be explained:

It is known that as the frequency varies within certain limits from above resonance to below resonance the voltage output of a frequency discriminator will vary from a negative to a positive value.

Figure 3:
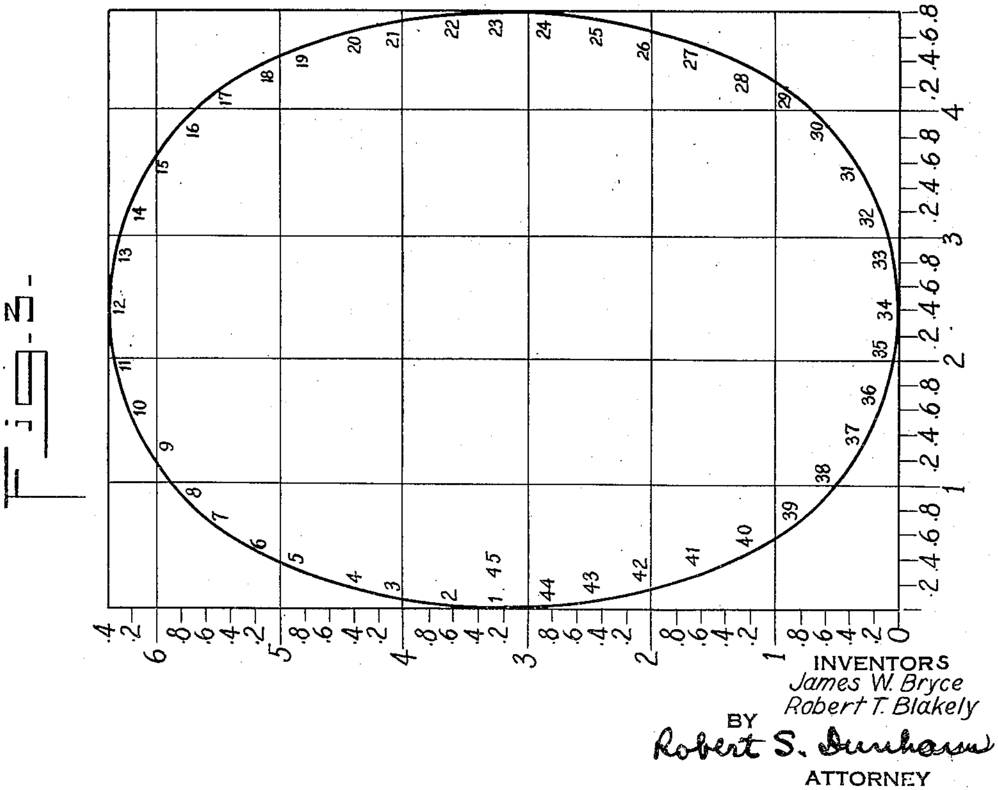
Fig. 3 is a diagrammatic graph view, showing the plotting utilized for the layout of a typical zero character.

Referring now to Figure 3, this graph shows the character zero laid out. The character has been divided up into a set of sections of equal length, this particular character being divided into sections 1 to 45 inclusive. In order to control tracing of an electron beam starting at 1 and proceeding to 12, it will be noted that the Y component voltage starts at an intermediate value and gradually increases to a maximum.

Figures 4, 5:
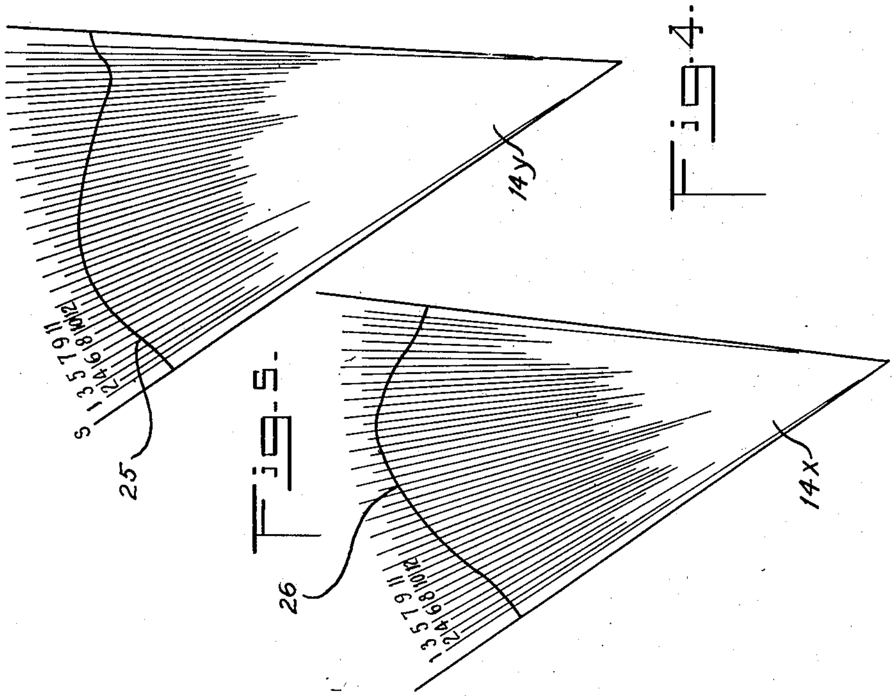
Fig. 4 is an enlarged segment of one of the pattern component emitter discs.
Fig. 5 is a similar view of the related segment on the other disc.

Referring now to Figure 4, 25 shows the contour of the Y plate for the segment which is to control the Y component for the character 0. It will be noted that the contour starts at a point S, remains constant to the 1 position and then increases gradually until point 12 is reached.

Considering now the 0 portion of the 14X disc (see Figure 3) the X component starts from a 0 value at point 1 and gradually increases to one-half its maximum value at point 12.

Referring now to Figure 5, it will be noted that the disc contour gradually increases from a 0 value to one-half its maximum value at the 12 position (note the contour line 26).

When the tracing beam is to be held stationary its related disc will have a uniform contour. When the tracing beam is to change in height, the contour of the disc is progressively increased or decreased, as the case may be. When the height increases, the beam on the cathode ray tube moves either upwardly or to the right and when it decreases the beam either moves downwardly or to the left. The above of course applies to both discs.

To determine the height of the 14Y disc for a particular point on the 0 character as, for example, point 42, the Y ordinate distance in Fig. 3 is measured. This distance is used as a measure of the deflection voltage required on the cathode ray Y plates. From the graph Fig. 3 this ordinate value is seen to be 2 volts. Using a resonant frequency of 4.3 megacycles the corresponding operating frequency would then be:

$$4{,}300{,}000-25{,}000=4{,}275{,}000$$

where the 25,000 cycles corresponds to a potential of 2 volts in a discriminator circuit.

Substituting the above in Equation 1 with $L$=100 microhenries $$4.275\times10^6=\frac{1}{2\pi\sqrt{100\times10^{-6}\times C\times10^{-12}}}$$

$$C=\frac{1}{4\pi^2\times100\times10^{-6}\times4.275}{}^2$$

$$C=13.86 \text{ micromicrofarads}$$

With the fixed capacity equal to 13.70 micromicrofarads the amount of variable capacity required is $$13.86-13.70=0.16 \text{ micromicrofarads}$$

Substituting this value in Equation 2 to determine the area $$0.16=\frac{0.2244A}{0.020}$$

$$A=0.17952 \text{ sq. in.}$$

A width of .2 in. for the pickup plate gives a height of $$\frac{A}{\text{width}}=\frac{0.17952}{.2}=0.8976 \text{ in.}$$

at point 42.

To summarize:

The ordinate or abscissa value for a particular point on the character is determined. From the discriminator curve the frequency corresponding to this value is determined.

Knowing this frequency the capacity is determined from Equation 1 using $L=100$ microhenries.

From this determined capacity value the fixed capacity value of 13.70 micromicrofarads is subtracted to find the amount of the variable capacity. The superimposed area required to obtain this capacity is then found from Equation 2. This area divided by the width of .2 in. will give the height of the overlap at the point under consideration.

*Oscillator, discriminator and amplifier circuits*

Before describing the circuit diagram in detail, it may be mentioned that the variable X plate, in conjunction with the fixed X plate, and in further conjunction with a fixed condenser, controls an oscillator which may be termed an X oscillator and that the related variable Y plate, fixed Y plate, and fixed condenser, controls another oscillator which may be generally termed a Y oscillator. The X oscillator in turn, through a coupling circuit, controls an X frequency discriminator, and the Y oscillator, through a similar coupling circuit, controls a Y frequency discriminator. The output of the Y discriminator is fed to an X amplifier. From the X and Y amplifier units circuits lead off to the plates of the cathode ray number displaying tubes.

Figure 6:
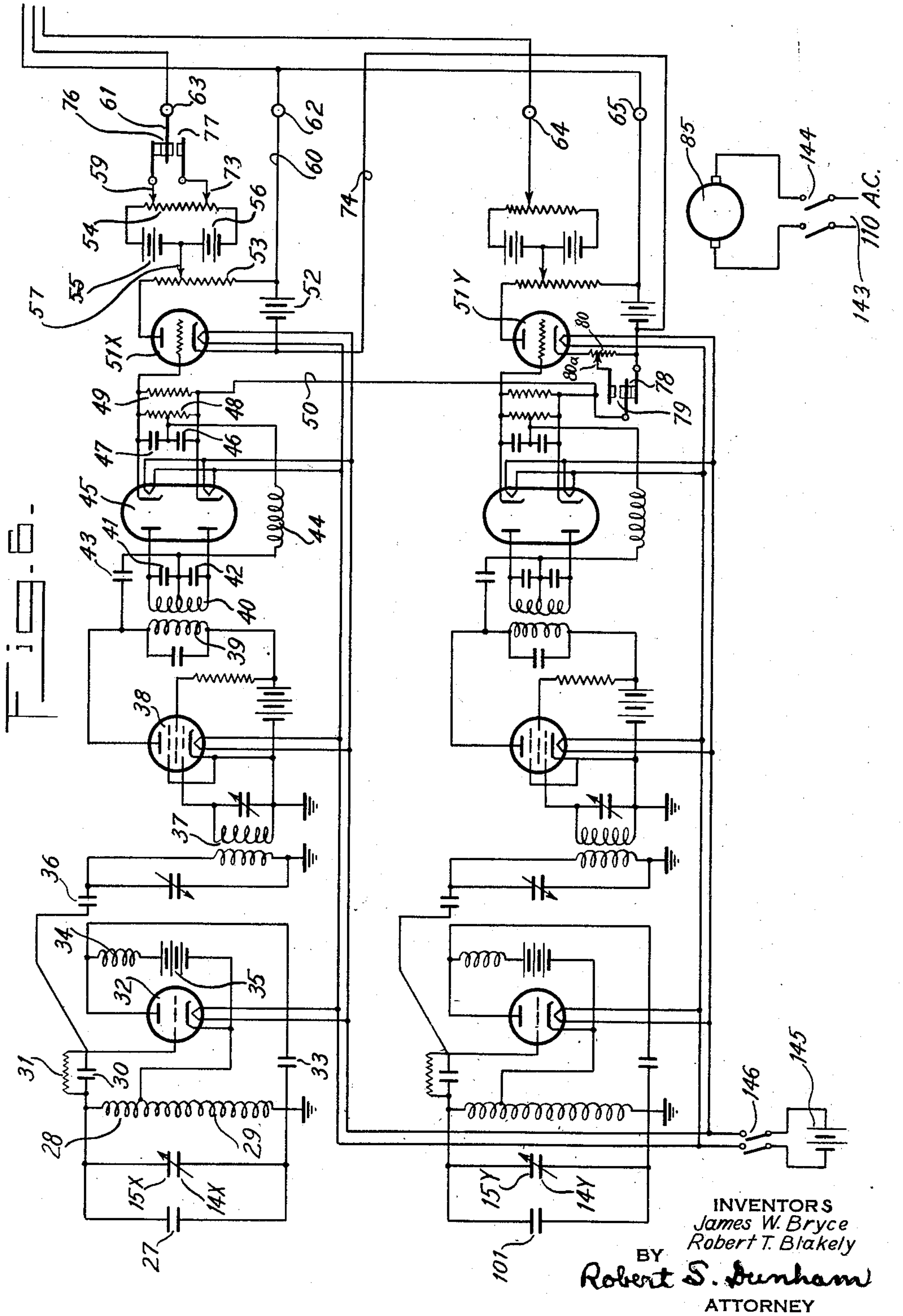
Fig. 6 is a circuit diagram showing the circuits of the apparatus up to and including the amplifier unit and with the output lines therefrom.

The X circuits will now be described. As shown in the circuit diagram Fig. 6, the variable capacitance provided by 14X and 15X is shunted by fixed capacitance 27. The combination of the capacitance 14X, 15X, 27, inductances 28 and 29, capacitor 30, resistor 31, tube 32, condenser 33, inductance 34, and battery 35 are connected in the well-known Hartley oscillator circuit. The output frequency of this oscillator is dependent upon the capacity of the 14X, 15X combination. This variable frequency output is coupled by means of a capacitor 36, transformer 37, to an amplifier tube 38. The output of this amplifier is coupled by inductances 39, to the input of a frequency discriminator circuit. The frequency discriminatory circuit includes an inductance 40, capacitors 41 and 42, capacitor 43, inductance 44, double diode tube 45, capacitors 46 and 47, and a resistor 48. The details and mode of operation of this frequency discriminator need not be further explained since reference may be had to A. R. R. L. Handbook, 1942 edition, page 142.

The lower end of a resistor 49, which is across the output of the frequency discriminator, is connected by means of a line 50 and contacts 78 and line 74 to the cathode of an amplifier tube 51. The other end of this resistor 49 is connected to the grid of amplifier tube 51. The plate cathode circuit of tube 51X includes a "B" battery or other source of direct current 52. A resistor 53 is disposed in series intermediate the positive side of the battery and the plate of tube 51X. For impressing a proper voltage control across the horizontal deflecting plates of the cathode ray tubes a biasing network is provided including a resistor 54 connected across a source of voltage preferably comprising series connected batteries 55 and 56. The conductor intermediate the batteries is also connected to a preliminary adjustable tap 57 on resistor 53. The output lines 60 and 61 are respectively connected to a preliminary adjustable tap 59 on resistor 54 through contacts 76 and to the positive side of battery 52. These output lines 60 and 61 connect with terminals 62 and 63. The said terminals 62 and 63 correspond to the terminals 58 and 57 in Bryce Patent No. 2,267,812 (see Fig. 15A). The X plates of the cathode ray number display tubes are connected to these terminals and the usual character selecting devices are also provided as fully described in the abovementioned Bryce patent.

It will be understood that the change in potential across terminals 62 and 63 controls the deflection of the electron beam in the cathode ray tubes for the X component of character display. This is fully described in the Bryce patent.

Having fully described the X oscillator, the X frequency discriminator, and the X amplifier, the description need not be repeated for the Y oscillator, the Y frequency discriminator, and the Y amplifier since the circuits are identical. It is sufficient to state that the Y amplifier output circuits extend to terminals 64 and 65 respectively, said terminals corresponding to terminals 66 and 67, as shown in Figure 15A of the Bryce patent.

*Character slant control*

If it is desired to control the character slant, switch control handle 75 is shifted to reverse position to that shown in Fig. 1. This will open contacts 76, 78 and close contacts 77 and 79. A cathode resistor 80 is provided in the cathode circuit of amplifier tube 51Y. Connection from an adjustable contact **80*a* provides a cathode follower connection through contacts 79 to the lower end of resistor 49 via wire 50**.

As current flow is increased through amplifier tube 51Y this cathode follower connection raises the potential at the lower end of resistor 49 and augments the "X" potential normally applied by discriminator tube 45. This provides a correspondingly greater "X" potential as the "Y" potential is increased. The ultimate is that the displayed character has a slant to the right. The amount of slant is controllable by varying the position of tap **80*a***.

Figure 7:
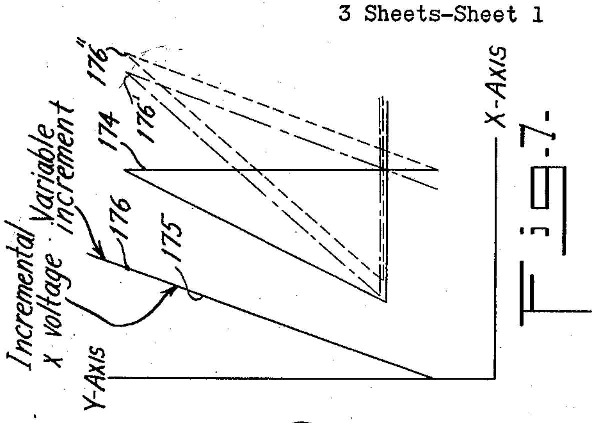
Fig. 7 is a diagrammatic showing of the effect of slant control on a displayed character.

In addition, the switching of contacts 76 and 77 places control of the character centering under tap 73 so that, as the character is slanted in it may be recentered for symmetry on the cathode ray tube screen. These effects are shown in Fig. 7. 174 represents in outline the conventional upright characterization of the character 4. Line 175 represents the angle of character slant, and at any abscissa value as point 176 the ordinate represents the increase over normal ordinate distance which causes the character to slant. The dotted line which includes point 176′ represents the control effected by contact 78 and the dot and dash line including point 176″ represents the recentering effected by contact 77.

What is claimed is:

1. Control apparatus for controlling electron beams of a cathode ray character displaying device including in combination a pair of fixed plates, rotatable elements having a pair of plates shaped to provide successive variable overlapping areas representative of successive character designations with respect to said fixed plates during rotation thereof, means for continuously rotating said rotatable elements, a pair of oscillators with the frequency thereof controlled by variations in capacity induced by the rotatable elements when in motion past the fixed plates, a pair of frequency discriminators coupled to said oscillators to provide variable voltage outputs, and means responsive to said outputs for controlling the electron beams of the cathode ray displaying device.

2. Control apparatus for controlling the electron beams of a cathode ray character displaying device comprising capacity change inducing means including fixed plates and cooperating continuously rotating plates shaped to provide variable overlapping areas with respect to the fixed plates upon rotation of the rotatable plates, a fixed capacitance associated with each of said capacity change inducing means, a pair of oscillators controlled by the aforesaid capacity change inducing means to produce frequencies which vary from a predetermined frequency controlled by said fixed capacitance in accordance with capacity thereof, a pair of frequency discriminators controlled by the oscillators to induce changes in potential corresponding to the changes in capacity and amplifying means controlled by the frequency discriminating means and affording output potentials for controlling the electron beams, said rotatable plates having a configuration to control tracing of the outlines of complete sets of different characters upon each rotation of the rotatable plates.

3. A slant control for a cathode ray character displaying apparatus comprising in combination a pair of voltage output amplifiers, one for an X component and another for a Y component means to control the output potentials of said amplifiers whereby the potential outputs are representative of components of character outlines, a cathode resistor in the Y amplifier, and a cathode follower connection from said resistor to the input of the X amplifier to provide a correspondingly greater X potential as the Y potential is increased for the purpose described.

4. The invention according to claim 3 wherein switching means are provided to establish or break said cathode follower connection.

5. The invention according to claim 3 wherein re-centering control means are provided for re-centering the displayed character.

6. A control apparatus for supplying variable potentials to amplifying means in accordance with predetermined voltage variations, including in combination, a pair of frequency discriminators, one for each of two components of the voltage, which discriminators are coupled to the amplifying means to supply variable potentials thereto, a pair of oscillators each of which supplies variable frequencies to its related frequency discriminator, means for varying the frequencies generated by the oscillators from a predetermined frequency comprising capacity change inducing means for each of the oscillators, each capacity change inducing means including a fixed capacity plate and a rotatable capacity plate, each rotatable plate having a configuration shaped to provide variable areas of overlap with respect to the fixed plate upon rotation of the rotatable plate, said areas of each rotatable plate being shaped in accordance with the related voltage component, said two voltage components corresponding to the components of a character outline, and a common driving means for the said rotatable capacity plates whereby the component voltage variations are synchronized so that two synchronized voltage variations corresponding to the components of a character outline are generated.

7. An apparatus of the class described including in combination a pattern component emitter unit comprising means to generate successive capacity changes representative of the components of a succession of different characters, said emitter unit comprising a continuously movable plate means and fixed plate means, oscillating means controlled by the capacity changes of said emitter, frequency discriminating means controlled by said oscillating means to produce a varying potential output, and amplifying means controlled by said potential output for providing variable potential amplitudes in accordance with changes in capacity generated by said continuously movable plate means and fixed plate means.

JAMES W. BRYCE.
ROBERT T. BLAKELY.

REFERENCES CITED

The following references are of record in the file of this patent:

UNITED STATES PATENTS

| Number | Name | Date |
|---|---|---|
| 2,248,661 | Culver | July 8, 1941 |
| 2,267,812 | Bryce | Dec. 30, 1941 |
| 2,387,496 | Cornelius | Oct. 23, 1945 |

OTHER REFERENCES

AIEE Journal, Nov. 1947, "Number Display Using the Cathode Ray Tube" by G. T. Baker (paper dated Oct. 16, 1946) pp. 421–426.